United States Patent [19]
Vinegar et al.

[11] Patent Number: 6,023,554
[45] Date of Patent: Feb. 8, 2000

[54] ELECTRICAL HEATER

[75] Inventors: Harold J. Vinegar; Eric De Rouffignac, both of Houston, Tex.

[73] Assignee: Shell Oil Company, Houston, Tex.

[21] Appl. No.: 09/080,683

[22] Filed: May 18, 1998

Related U.S. Application Data

[60] Provisional application No. 60/047,214, May 20, 1997.

[51] Int. Cl.$^7$ .................................................... E21B 7/15
[52] U.S. Cl. ............................................. 392/301; 166/60
[58] Field of Search ........................... 392/301; 166/302, 166/385, 60; 405/128; 219/481, 501, 212, 492, 504, 505

[56] References Cited

U.S. PATENT DOCUMENTS

| | | | |
|---|---|---|---|
| 2,732,195 | 1/1956 | Ljungstrom | 262/3 |
| 4,570,715 | 2/1986 | Meurs et al. | 166/302 |
| 4,572,299 | 2/1986 | Vanegmond et al. | 166/385 |
| 4,640,352 | 2/1987 | Van Meurs et al. | 166/245 |
| 4,886,118 | 12/1989 | Van Meurs et al. | 166/245 |
| 5,060,287 | 10/1991 | Egmond | 392/301 |
| 5,065,818 | 11/1991 | Egmond | 166/60 |
| 5,244,310 | 9/1993 | Johnson | 405/128 |
| 5,318,116 | 6/1994 | Vinegar et al. | 166/60 |

OTHER PUBLICATIONS

*Chemical Engineering Handbook*, 5$^{th}$ Ed., Perry and Chilton, pp. 10–48, 10–52 (1973).

*Primary Examiner*—John A. Jeffery
*Assistant Examiner*—Vinod D Patel
*Attorney, Agent, or Firm*—Del S. Christensen

[57] ABSTRACT

A heater is disclosed, the heater comprising: a heating element effective to generate radiant energy; a casing surrounding the heating element separated from the heating element; and support material between the casing and the heating element wherein the support material comprises a granular solid material that is translucent to radiant energy in the peak wavelength of energy which is radiated by the heating element at operating temperatures. The translucency of the support material is such that at least 50% of the radiant energy emitted by the heating element is radiated to the casing.

10 Claims, 1 Drawing Sheet

ELECTRICAL HEATER

RELATED APPLICATIONS

This application claims priority to U.S. patent application Ser. No. 60/047,214, filed on May 20, 1997.

FIELD OF THE INVENTION

This invention relates to a high temperature electrical heating method and apparatus.

BACKGROUND TO THE INVENTION

U.S. Pat. Nos. 4,640,352 and 4,886,118 disclose conductive heating of subterranean formations of low permeability that contain oil to recover oil therefrom. Low permeability formations include diatomites, lipid coals, and oil shales. Formations of low permeability are not amiable to secondary oil recovery methods such as steam, carbon dioxide, or fire flooding. Flooding materials tend to penetrate formations that have low permeabilities preferentially through fractures. The injected materials bypass most of the formation hydrocarbons. In contrast, conductive heating does not require fluid transport into the formation. Oil within the formation is therefore not bypassed as in a flooding process. Heat injection wells are utilized to provide the heat for such processes.

Heat injection wells can also be useful in decontamination of soils. U.S. Pat. Nos. 5,318,116 and 5,244,310, for example, disclose methods for decontamination of soils wherein heat is injected below the surface of the soil in order to vaporize the contaminates. The heaters of patent '310 utilize electrical resistance of spikes, with electricity passing through the spikes to the earth. Patent '116 discloses heater elements passing through the wellbore to the bottom of the formation to be heated. The wellbore surrounding the heater includes a catalyst bed, which is heated by the heater elements. Heat conductively passes through the catalyst bed to a casing surrounding the catalyst bed, and then radiantly from the casing to the soil surrounding the wellbore. Typical alumina based catalysts have very low thermal conductivities, and a significant temperature gradient will exist through the catalyst bed. This significant temperature gradient will result in decreased heat transfer to the earth being heated at a limited heater element temperature.

Patent '118 discloses a heater well with heater cables cemented directly into the wellbore. The heater well optionally includes a channel for lowering a thermocouple through the cemented wellbore for logging a temperature profile of the heater well. Being cemented directly into the wellbore, a need for a casing is eliminated, but the diameter of the cable is relatively small. The small diameter of the heater cable limits the amount of heat that can be transferred to the formation from the heater cable because the area through which heat must pass at the surface of the cable is limited. A cement will have a relatively low thermal conductivity, and therefore, a greater heat flux at the surface of the cable would result in an unacceptably high heater cable temperature. Multiple heater cables may be cemented into the weilbore to increase the heat transfer to the formation above that which would be possible with only one cable, but it would be desirable to further increase the heat that can be transferred into earth surrounding the heaters.

U.S. Pat. No. 2,732,195 discloses an electrical heater well wherein an "electrically resistant pulverulent" substance, preferably quartz sand or crushed quartz gravel, is placed both inside and outside of a casing of a weilbore heater. The quartz is placed there to reinforce the casing against external pressures, but materials that have significant translucency to radiant energy are not suggested.

It is therefore an object of the present invention to provide an electrical heater element wherein the electrical heater element has a significant surface area at a temperature that is closer the temperature of the electrical resistance element than those of the prior art. This heater element is useful as a well heater for such purposes as thermal recovery of hydrocarbons and soil remediation.

SUMMARY OF THE INVENTION

These and other objects are accomplished by an electrical heater comprising: a heating element effective to generate radiant energy; a casing surrounding the heating element separated from the heating element; and support material between the casing and the heating element wherein the support material comprises a granular solid material that is translucent to radiant energy in the peak wavelength of energy which is radiated by the heating element at operating temperatures. The translucency of the support material is such that at least 50% of the radiant energy emitted by the heating element is radiated to the casing. The support material not only provides support for the casing, but can be chosen to prevent shorting of electricity from the heating element to the casing. Support from the support material reduces the wall thickness required in the casing, and therefore lowers the cost of the heater. The translucence of the electrical insulation material enables radiant heat transfer directly from the heating element to the casing. The casing temperature is therefore significantly closer to the temperature of the heating element.

In an application such as a weilbore heater for thermal recovery of hydrocarbons and soil remediation, the casing can be of a significant diameter, such as three to twelve inches. The thickness of the casing at these diameters is not excessive because the granular electrical insulation provides support for the casing and prevents collapse of the casing due to external pressure.

DETAILED DESCRIPTION OF THE INVENTION

Figure 1:
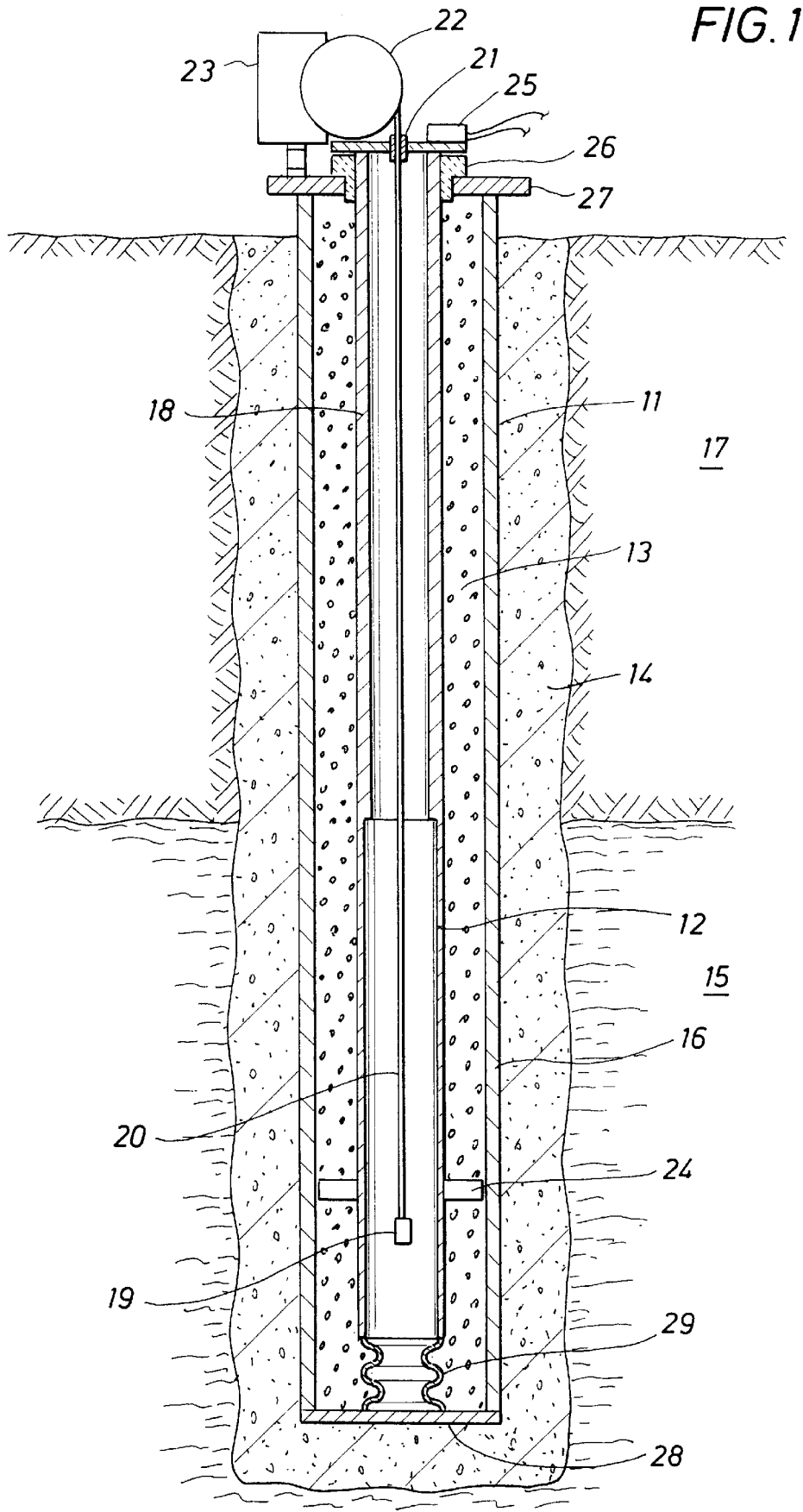
FIG. 1 shows a heating element according to the present invention.

The heater of the present invention comprises a heating element, a casing surrounding the heating element, and support material separating the resistance heating element and the casing. The support material is translucent to radiant energy generated by the resistance heating element so that heat transfer from the electrical heating element to the casing is both radiant, and conductive. Adding radiant heat transfer to the conductive heat transfer mechanism significantly aids the transfer of heat, and thus the difference in temperature between the casing and the resistance element is reduced. Radiant heat transfer enables a casing of significant diameter, for example, 2 to about 12 inches. This greater diameter casing results in increased area for flux of heat from the heating element. The heat that can be transferred from the casing is therefore increased accordingly.

The support material can also be an electrical insulating material. The support material enables the casing to be fabricated thinner than what would be required to support an expected external pressure on the casing. In applications such as heat injectors for injection of heat to an oil shale or diatomite formations, significantly lower cost casing may be used due to the support from the support material.

When the present invention is applied in a well heater, the casing may either be cemented into the formation or not cemented into the formation. Leaving a larger diameter borehole surrounding the heater may result in greater heat transfer to the formation because of radiant heat transfer from the casing. Alternatively, any space between the casing and the borehole may be filled with cement to help support the casing, or may be filled with granular solids such as the electrical insulating material of the present invention to both provide support, and to provide radiant heat transfer through the material to the walls of the borehole.

As is well known in the art, for each temperature, a curve may be found for energy transferred from a black body as a function of wavelength. *Chemical Engineering Handbook* 5th ed., Perry and Chilton, p. 10–48, 10–52 (1973), describes these functions. These functions will peak, and from the peak will decrease and asymptotically approach zero at great wavelengths. These functions will peak at shorter wavelengths for higher temperatures, and greater wavelengths for lower temperatures.

The temperature from which energy is radiated from the electrical heating element is readily estimated or determined empirically.

The support material is selected so that the material has a translucency to radiated energy of the peak wavelength of the energy radiated from the resistance heating element. Materials that are translucent are generally translucent over a specific band of wave lengths. Quartz (crystalline silicon dioxide) has a band of translucency that extends to a wavelength of about three microns. This corresponds to the maximum on a curve of wavelength vs. energy for radiation at about 730° C. Thus, about half of the energy emitted from a black-body source would be absorbed by quartz for every centimeter of depth. At higher element temperatures, less heat would be absorbed by the quartz. But higher temperatures require extremely expensive materials. Glass (borosilicate) is translucent over the range of visible light, but has negligible transparency to infrared wavelength radiation. Crystals of calcium fluoride are translucent to energy of up to about 12 microns wavelength. Thus, about 95 percent of energy transmitted by a black body source at 730° C. would be transmitted through a one centimeter depth of crystalline calcium fluoride. Calcium fluoride also has a very high melting point (1418° C.) and a fairly high thermal conductivity (0.022 watt/cm/° K at 730° C.).

At a sufficiently high temperature, a high quality crystalline quartz may be an acceptable support material according the present invention, but relatively high heater temperatures would be required, and thicknesses of the support material, and therefore diameter of the casing, would be relatively limited.

The energy radiated from the heater element to the casing can be estimated based on the black body curve of energy radiated as a function of wavelength, multiplied by the total absorption of the electrical insulation over the distance between the casing and the electrical resistance element. Adding this radiantly transferred heat to heat transferred by thermal conduction significantly increases the amount of energy that can be transmitted away from the heating element. Further, the relatively large diameter of the casing provides a significantly greater surface area through which heat is then transferred to the surrounding volume. When the heater is in a borehole, this larger surface area is important because earth surrounding the heating element is generally not a good conductor of heat, so the greater surface area significantly increases the heat transferred to the earth formation.

Referring now to FIG. 1, a heater 16 of the present invention is shown cemented into a formation to be heated 15, the formation to be heated being below a strata that is not to be heated 17. A casing 11 separates the formation from the heater element 12. An upper section of the heater element 18 is of a thicker cross section so that significant heat is not generated in this section. The heater element is shown as a hollow tube, so that a thermocouple 19 may be lowered through the heater by a wireline 20 through a seal 21 at the surface. The wireline can be stored on a spool 22 that is turned by an electrical motor 23. An annulus between the heater element 12 and the casing 11, within the portion of the formation to be heated, is filled with the support material 13. Within the portion of the formation that is not to be heated, the support material may be granular solid that is not the granular solid that is translucent to radiant energy, which may be less expensive.

Cement 14 may be placed around the casing to secure the casing in place. Alternatively, the annular space could be filled with granular solids that are translucent to the wavelength energy transmitted from the casing. This material may be the same as the support material between the casing and the heater element, or it may be different. Because the casing 11 will be at a lower temperature than the electrical resistance element, a material translucent to longer wave length energy may be required. But the material outside of the casing does not have to be electrically insulating.

A centralizer 24 is shown separating the heater element from the casing. The support material may also be electrically insulating, and thereby permitting the surface of the heating element to be a resistance element without electrical insulation around the element. In this embodiment, a plurality of non-electrical conductive centralizers would preferably be utilized. An electrically conductive centralizer may be used near the bottom of the electrical resistive element to ground the electrical resistive element in order to provide a path for electrical energy. An electrical power supply is connected to the heater element at the surface at a terminal 25, and the heater element is electrically isolated from the casing at the wellhead by means such as ceramic insulator 26 at a top seal flange 27.

At the bottom of the casing, the casing may be sealed by a seal plate 28 welded to the casing, or alternatively, the bottom of the casing may be sealed by cement and/or a cement shoe as is typical practice in the art of oil and gas drilling. When the bottom of the casing is sealed by a welded plate, a bellows 29 could be provided to both seal the bottom of the heating element and to provide electrical continuity to ground.

Within the formation to be heated, the heating element may be designed to have a varying heat output. This may be accomplished by providing an electrical heating element with a varying cross section area in order to tailor the generation of heat to a desired profile.

In another embodiment, a retrievable electric heating element can be inserted inside the center tubular. The electrical heating element can consist of a mineral-insulated heating cable or a ceramic bead insulated heating cable.

Although the invention is described in greatest detail in a well heater application, the invention is broadly applicable to other applications. For example, when a heater is to be operated in a high pressure liquid or gas environment.

We claim:

1. A heater comprising:

a heating element effective to generate radiant energy;

a casing surrounding the heating element separated from the heating element; and support material between the casing and the heating element wherein the support material comprises a granular solid material that is translucent to radiant energy in the peak wavelength of energy which is radiated by the heating element at operating temperatures wherein at least 50% of the radiant energy emitted by the heating element is radiated directly to the casing.

2. The heater of claim 1 wherein the diameter of the casing is between about 2 and about 12 inches.

3. The heater of claim 2 wherein the heating element is separated from the casing by between about one to about three inches.

4. The heater element of claim 1 wherein the casing is cemented into a wellbore.

5. The heater of claim 1 further comprising at least one centralizer wherein the centralizer is effective to maintain the position of the heating element essentially along a centerline of the casing.

6. The heater of claim 1 wherein the support material comprises calcium fluoride.

7. The heater of claim 1 wherein the temperature from which heat is radiated from the heating element is greater than about 700° C.

8. The heater of claim 1 wherein the heating element is a hollow tubular containing an electrical heating element.

9. The heater of claim 8 further comprising a thermocouple movably located within the hollow tubular, the thermocouple suitable for obtaining temperatures along the heating element.

10. The heater of claim 1 wherein the heating element comprises an electrical heater element that varies in cross-sectional area to cause heat generated by the heating element to vary according to a preselected heat injection profile.

* * * * *